US012578455B2

(12) United States Patent
Gray

(10) Patent No.: US 12,578,455 B2
(45) Date of Patent: Mar. 17, 2026

(54) METHOD AND SYSTEM FOR DETERMINING THE LOCATION OF AN ITEM IN A STORAGE SYSTEM

(71) Applicant: SATO HOLDINGS KABUSHIKI KAISHA, Tokyo (JP)

(72) Inventor: Jeff Gray, St. Peters (AU)

(73) Assignee: Sato Corporation, Tokyo (JP)

( * ) Notice: Subject to any disclaimer, the term of this patent is extended or adjusted under 35 U.S.C. 154(b) by 0 days.

(21) Appl. No.: 18/839,186

(22) PCT Filed: Feb. 18, 2022

(86) PCT No.: PCT/IB2022/051445
§ 371 (c)(1),
(2) Date: Aug. 16, 2024

(87) PCT Pub. No.: WO2023/156820
PCT Pub. Date: Aug. 24, 2023

(65) Prior Publication Data
US 2025/0164631 A1     May 22, 2025

(51) Int. Cl.
*G01S 13/75*     (2006.01)
*G06K 7/10*     (2006.01)
(52) U.S. Cl.
CPC ........ *G01S 13/758* (2013.01); *G06K 7/10217* (2013.01); *G06K 7/10297* (2013.01)
(58) Field of Classification Search
CPC .............. G01S 13/758; G06K 7/10217; G06K 7/10297; G06K 7/10415; G06K 7/10356
See application file for complete search history.

(56) References Cited

U.S. PATENT DOCUMENTS

| | | | | |
|---|---|---|---|---|
| 8,339,265 | B2 * | 12/2012 | Campero | G06K 7/0008 340/572.1 |
| 2011/0199211 | A1 | 8/2011 | Campero et al. | |
| 2020/0161742 | A1 | 5/2020 | Leitermann et al. | |
| 2021/0150462 | A1 * | 5/2021 | Leitermann | G06K 7/10415 |
| 2022/0100976 | A1 * | 3/2022 | Sithamparanathan | G06K 7/10029 |

FOREIGN PATENT DOCUMENTS

BR     PI0610772 A2 * 11/2010

OTHER PUBLICATIONS

International Search Report dated Oct. 12, 2022, issued in counterpart International application No. PCT/IB2022/051445. (3 pages).

* cited by examiner

*Primary Examiner* — Sonji N Johnson
(74) *Attorney, Agent, or Firm* — WHDA, LLP

(57)     ABSTRACT

A method of determining the location of a plurality of tagged items in a storage system comprises scanning (540) for tags with a first antenna at a plurality of power levels, analysing (560) the scan to identify each tag of interest sighted by the first antenna at each power level of the plurality of power levels, and scanning (540) for tags with at least one further antenna at a plurality of power levels. The method further comprises analysing (560) the further scan to identify each tag of interest sighted by each further antenna at each power level of the plurality of power levels, further analysing (560) the scan to determine the antenna with the lowest power level that identified each tag of interest, and estimating a position (580) of each tag of interest using the determined antenna and the lowest power level that identified that tag.

21 Claims, 4 Drawing Sheets

520
Calibrate

540
Scan

560
Analyse

580
Locate

METHOD AND SYSTEM FOR DETERMINING THE LOCATION OF AN ITEM IN A STORAGE SYSTEM

TECHNICAL FIELD

The present disclosure relates, generally, to determining a location of a tag located in a storage cabinet and, more particularly, to a system for, and a method of, determining a location of a radio-frequency identification (RFID) tagged item in a multi-shelf cabinet.

BACKGROUND

Radio-frequency identification (RFID) is a wireless identification method where data is electronically stored on a tag, and the data is readable by an RFID reader in order to identify, locate, and/or track the tagged items. RFID systems are not necessarily configured to provide an accurate location of a tagged item, but instead often provide a general location of a tagged item. For example, where tagged items are located in a cabinet, an RFID reader is often configured to ascertain the presence of a tag within the cabinet, but not necessarily on which shelf or in which drawer within the cabinet the tagged item is located.

RFID readers operate by generating an electrical signal, producing an electromagnetic field that interacts with the antenna coils of RFID tags to interrogate the tags and obtain identification information from the tags.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided a method of determining the location of a plurality of tagged items in a storage system, the method comprising: scanning for tags with a first antenna at a plurality of power levels; identifying each tag of interest sighted by the first antenna at each power level of the plurality of power levels; scanning for tags with at least one further antenna at a plurality of power levels; identifying each tag of interest sighted by each further antenna at each power level of the plurality of power levels; determining the antenna with the lowest power level that identified each tag of interest; and estimating a position of each tag of interest using the determined antenna and the lowest power level that identified that tag.

The step of scanning for tags with a first antenna at a plurality of power levels may comprise activating an antenna coil of the first antenna at each of the plurality of power levels. The step of identifying each tag sighted by the first antenna at each power level may comprise receiving response signals from at least a portion of the plurality of tags at each power level. A field intensity emitted from each antenna may vary a predetermined amount according to each power level. The power levels may be logical power levels that correspond to actual power levels required for predetermined antenna ranges. The method may comprise deriving a logical power level for each antenna that corresponds to actual power levels required to reach a predetermined distance.

The method may further comprise the step of calibrating antenna power levels in the storage system. The step of calibrating the antenna power levels in the storage system may comprise placing a plurality of calibration tags into the storage system; scanning for the calibration tags with each antenna at a plurality of different power levels; identifying the minimum power level each antenna sights each calibration tag; and setting one or more calibration values for each antenna from the identified minimum power levels. The steps of calibrating the antenna power levels in the storage system may be repeated with the calibration tags being located at a plurality of different levels within the storage system. The step of calibration may compensate for antenna coil differences such that each logical power level of each antenna corresponds to substantially the same antenna coil range.

The tags may be set to a lower power mode, that reduces the number of tags in the storage system that are active, prior to scanning for the tags. The tags may comprise memory. The method may further comprise the step of storing a value representative of the power level at which the tag is first sighted. The memory may comprise a time stamp field. The value representative of the power level at which the tag is first sighted may be stored in the time stamp. The value representative of the power level at which the tag is first sighted field may comprise a power level ID.

The step of estimating a position of each tag of interest using the determined antenna and the lowest power level that identified that tag may comprise identifying a height level of the storage system at which the tag is located. The step of identifying a height level of the storage system at which the tag of interest is located may comprise applying a power level offset. The power level offset may bias antenna power levels towards a lower height level for each height level of the storage system. The power level offset may be applied to a logical power level for the antenna. The step of estimating a position of each tag of interest using the determined antenna and the lowest power level that identified that tag may comprise identifying a horizontal position of the tag of interest at the height level of the storage system at which the tag is identified as being located. The horizontal position of the tag of interest may be determined to be at a distance from the antenna with the lowest power level that identified that tag that corresponds to a range of that antenna at that power level.

The first antenna and at least one further antenna may be located on or in the storage system. The storage system may comprise height levels and at least some of the height levels comprise at least two overlapping antennas with overlapping coils. Each of the at least two antennas with overlapping coils may comprise a first loop having a first current flow and a second loop having a second current flow in a rotationally opposite direction to the first current flow. The overlapping antenna coils of the overlapping antennas may be arranged to overlap so that the loops are aligned along an axis, thereby generating a continuous reading zone along that axis. The continuous reading zone may correspond to a section of the storage system.

In another aspect there is provided a system for determining the location of an RFID tagged item located in a storage system configured to contain a plurality of RFID tagged items, the system comprising: a plurality of antenna coils configured to be associated with one or more height levels of the storage system; an antenna controller configured to energise the antenna coils at a power level that corresponds to a received power level signal; and a processor in communication with the antenna controller, the processor configured to: output a plurality of power level signals to the antenna controller to selectively activate each RFID antenna coil at a plurality of different power levels; receive response signals from each antenna coil at each power level; identify each RFID tag sighted in each received response signal; determine the antenna coil with the lowest power level that identified each RFID tag of interest; and estimate a position of at least one RFID tagged item of interest using the determined antenna coil and the lowest power level that identified its tag.

Any promises made in the present description should be understood to relate to some non-limiting embodiments, and are not intended to be promises made about the invention as a whole. Where there are promises that are deemed to apply to all non-limiting embodiments, the applicant/patentee reserves the right to later delete them from the description and does not rely on these promises for the acceptance or subsequent grant of a patent in any country.

These and other aspects and features will now become apparent to those skilled in the art upon review of the following description of specific non-limiting embodiments in conjunction with the accompanying drawings.

BRIEF DESCRIPTION OF DRAWINGS

The detailed description of illustrative (non-limiting) non-limiting embodiments will be more fully appreciated when taken in conjunction with to the accompanying drawings in which.

In the drawings, like reference numerals designate similar parts.

The drawings are not necessarily to scale and may be illustrated by phantom lines, diagrammatic representations and fragmentary views. In certain instances, details that are not necessary for an understanding of the non-limiting embodiments or that render other details difficult to perceive may have been omitted.

DESCRIPTION

Reference will now be made in detail to various non-limiting embodiments of methods and systems for determining the location of an item in a storage system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

System Overview

Figure 1:
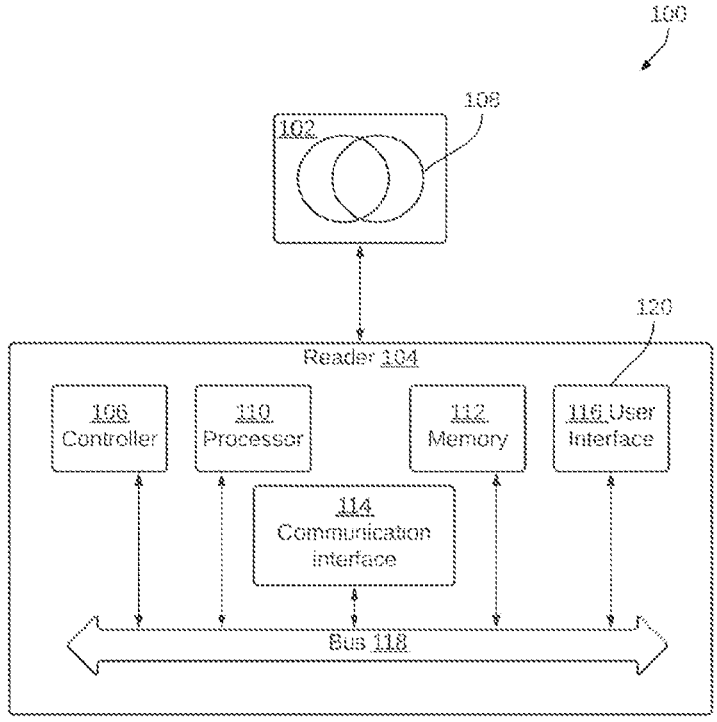
FIG. 1 is a schematic representation of a non-limiting embodiment of an RFID system.

FIG. 1 of the drawings is a schematic representation of a non-limiting embodiment of an RFID reader system 100 for determining a location of an item within sections of a region. The system 100 has an arrangement of antenna coils 102 in communication with an RFID reader 104. The RFID reader 104 comprises an antenna controller 106 configured to selectively power each antenna coil 108 at a plurality of different power levels, and a processor 110. The processor 110 is configured to receive a plurality of response signals from the arrangement of antenna coils 102. The response signals are generated in response to one or more interrogation signals from the reader 104. In some non-limiting embodiments the controller and the processor may be provided in one shared processing unit.

In addition to the controller 106 and the processor 110, the RFID reader 104 includes various modules 120 that support the operation of the RFID reader 104. These modules may include one or more of: memory 112 (e.g., volatile memory, non-volatile memory, and/or other storage), a communication interface 114 supporting communication between the reader 104 and other equipment (for example in the form of a network interface controller or other interface hardware), and a user interface 116. The modules 120 of the RFID reader 104 cooperate with each other by exchanging data over a bus 118.

The user interface 116 may include, for example, a display means such as a screen and/or a touch screen together with a keyboard and/or other buttons/levers, etc. The communication interface 114 may be in communication with or support communication between the RFID reader 104 and a user device (not illustrated). The user device may include a computer, laptop, handheld device, tablet, smart phone, etc. The user device may include software for receiving and displaying information received from the reader 104, for example via an end user application in the form of application software such as a mobile "app", a website, and/or a web application etc configured to receive and display tag location data as determined by the reader 104.

Figure 2A:
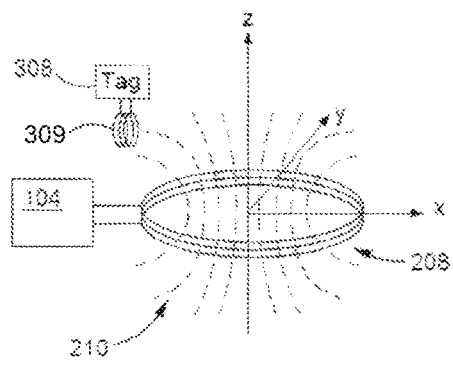
FIG. 2A is a diagrammatic representation of an RFID antenna and its magnetic field coupling with an RFID tag.

FIG. 2A illustrates the operation of an RFID reader 104 in communication with an antenna coil 208. The antenna coil 208 generates a magnetic field H 210 around the coil as illustrated in broken lines. The magnetic field 210 defines a reading zone around the coil in which RFID tags can be detected. The magnetic field is able to couple with the tag antenna of an RFID tag 308 located within the magnetic field, either above or below the coil 208. In the exemplary non-limiting embodiment, the antenna coil 208 is positioned on, within, or otherwise associated with the floor of a shelf so that the shelf may be considered to lie in the X-Y plane illustrated in FIG. 2A. Accordingly, it will be understood that RFID tags may be located in the generated magnetic field either above the shelf floor (in the +Z direction), or below the shelf floor (in the −Z direction), i.e., on a lower shelf.

Figure 2B:
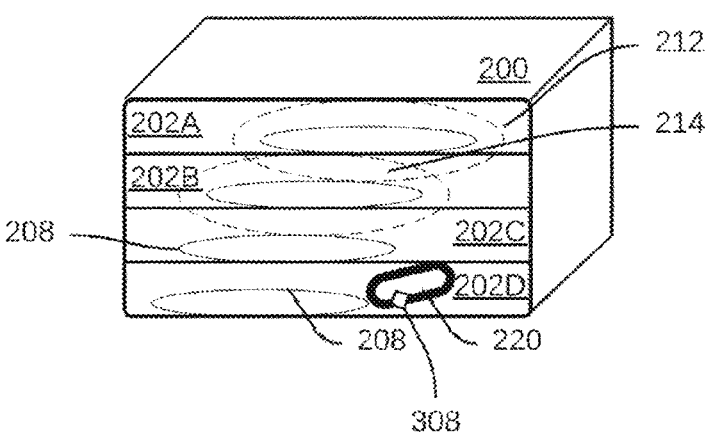
FIG. 2B is a diagrammatic view of a storage system having a plurality of shelves and RFID antennas distributed throughout.

FIG. 2B illustrates a storage system 200 having a plurality of levels in the form of shelves 202A-202D. Items 220 contained within the storage system 200 have RFID tags 308 able to be read by one or more of the antenna coils 208. It should be appreciated that the shelves 202A-202D may take other forms such as, for example, racks, drawers, trays, compartments, or the like. Although only one antenna coil per shelf is indicated diagrammatically for clarity, it should be appreciated that this is for example only, and that more or less (including zero) antenna coils may be provided for each shelf. In some non-limiting embodiments each shelf has a plurality of antenna coils to provide accurate item location determination. Each coil is able to generate a magnetic field, thereby providing a reading zone 212 in which tags can be detected by the antenna.

Figure 3:
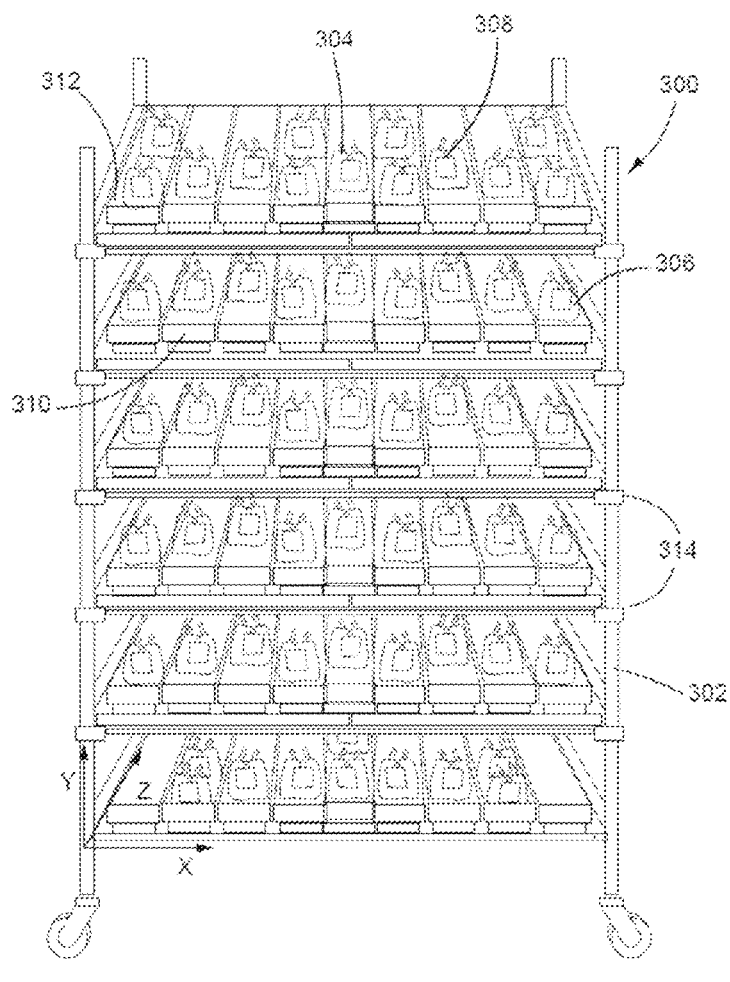
FIG. 3 illustrates an example non-limiting embodiment of a cabinet for which the RFID system of FIG. 1 may be used to locate an RFID tagged item within the cabinet.

The storage system may comprise a cabinet or fridge. Another example storage system 300 is illustrated in FIG. 3 of the drawings, being a trolley or cabinet 300 with the items to be located being plasma boxes or blood bags 306 with electronic tags in the form of RFID tags 308 affixed thereto. Each blood bag 306 is placed on a cabinet level (for example in a drawer or on a shelf 314), and each tagged item is also placed within a section 310 of the cabinet 300, each section 310 in the form of container, for example a tray 312. In this non-limiting embodiment, each shelf 314 includes a plurality of containers 312. As illustrated, the example cabinet 300 includes a plurality of levels in the form of shelves 314 (arranged vertically as labelled by the Y-axis), each shelf 314 including a plurality of trays 312. In the example non-limiting embodiment, the trays 312 are arranged in a single row along the width of the cabinet 300 (arranged horizontally as labelled by the X-axis).

Each tray 312 is longitudinal and configured to hold a plurality of RFID tagged blood bags 306 stacked in the longitudinal direction of the tray 312 across the depth of the cabinet 300 (as labelled by the Z-axis). Each blood bag 306 has an RFID tag 308 with a tag antenna. In the illustrated example, where the blood bags 306 are stacked in the Z direction, the tag antennas on the RFID tags 308 lie substantially in the X-Y plane. In alternative non-limiting embodiments, the trays may be arranged and/or stacked in various alternative configurations, for example each shelf may include two parallel rows of trays.

Antenna Arrangement

Figure 4:
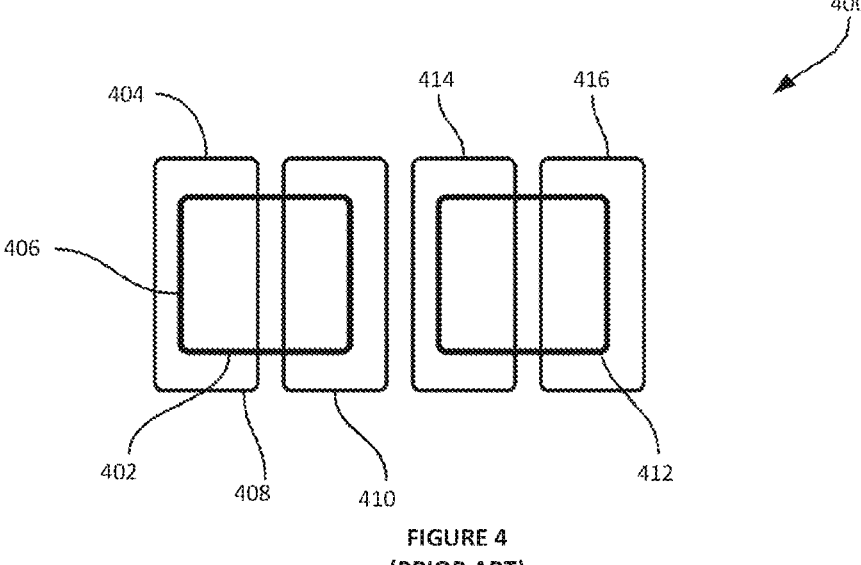
FIG. 4 is a schematic representation of a prior art antenna configuration.

FIG. 4 of the drawings is a schematic representation of a prior art antenna configuration 400. In the example, two antenna coils 402 are positioned relative to four trays 404 so that each coil 402 is associated with two of the trays 404. With this configuration, if the first antenna coil 406 provides a signal to a reader indicating the presence of an RFID tag, then that RFID tag may be located in either one of the first two trays 408, 410 associated with the first antenna coil 406. Similarly, if the second antenna coil 412 provides a signal to a reader indicating the presence of an RFID tag, then that RFID tag may be located in either one of the two trays 414, 416 associated with the second antenna coil 412. With this antenna configuration 400 it is therefore not possible to accurately locate an RFID tag within one of the four trays.

Another drawback of the configuration in FIG. 4 is that the maximum power produced by each coil is limited by Electromagnetic Compatibility (EMC) regulations which provide limitations for electromagnetic emissions at certain distances from electronic equipment. One solution is to configure the two coils 402 so that the current in one coil flows in an opposite direction to the current in the other coil, thereby resulting in magnetic fields that cancel each other out in the far field. However, if both coils are activated at the same time to result in such a net zero far field, then it is impossible to distinguish in which of the four trays 404 a tagged item is located.

In some non-limiting embodiments each level of a storage system (e.g. each shelf 202A-202D of the storage system 200 of FIG. 2) has antenna coils that overlap such that each item 220 with an RFID tag located therein may be powered by one or more coils and/or be seen by coils on multiple levels. In use, at least one antenna coil may have a first loop having a first current flow and a second loop having a second current flow in a rotationally opposite direction to the first current flow with at least one other antenna coil overlapping such that the loops are aligned along an axis, thereby generating a continuous reading zone along that axis.

Using such an antenna arrangement can create a plurality of reading zones, and in some non-limiting embodiments the reading zones are aligned with sections of the storage system, that can assist with narrowing down the likely location of one or more tags of interest. Furthermore, such an antenna arrangement can be utilised to reduce external emissions to assist the storage system meeting EMC requirements.

Method Overview

Figure 5:
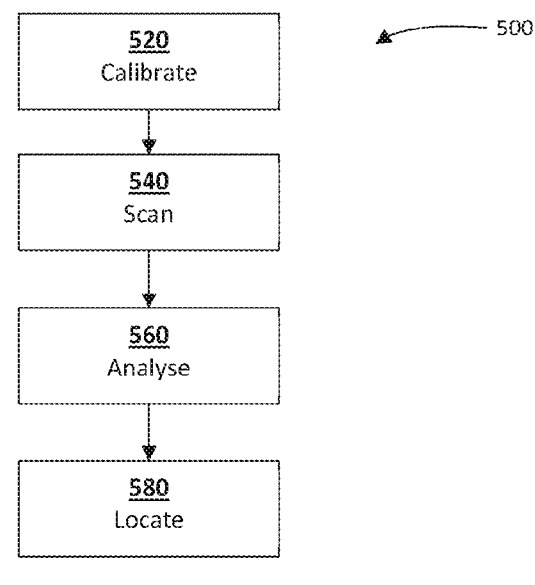
FIG. 5 is a flow diagram of a non-limiting embodiment of a method of determining a location of an item within a storage system.

FIG. 5 shows a flow diagram of a non-limiting embodiment of a method 500 of determining a location of an item associated with a detectable tag in a storage system. The method comprises, at 520 performing an antenna power level calibration and then at 540 a scan to ascertain tags detectable by each antenna at different power levels. The method further comprises, at 560 analysing the scan to identify each tag sighted by each antenna at a plurality of power levels and then, at 580 locating the item using that analysis. In a further step (not illustrated), the determined location may be displayed on a user interface 116 of the RFID reader 104 and/or provided to an end user via the reader's communication interface 114 (for example to be displayed on a user device such as a laptop running an end user application). Each step will be described in further detail as follows.

Antenna Power Level Calibration

In typical operation, antenna coils are operated at a maximum power level to provide the largest possible reading range and thereby maximise reception of RFID tags to determine their presence. However, such an approach does not reveal the location of the tag or its associated item. The range of an antenna coil may be reduced by reducing the power supplied thereto. This may occur by converting a digital power level signal, such as from a processor 110, to an analogue voltage (typically, although not necessarily, between 0 and 12-15V) powering the antenna coil. The effective range of the antenna coil varies proportionally to its power level. An antenna power level calibration can be performed to determine how power level correlates with distance for each antenna coil.

On a shelf antenna, for example, different antenna coils may have different geometries which means that the actual range of each coil will likely vary. In order to compare sighting distances between different antenna coils, the calibration measures power needed to read tags at several distances and set calibration values for each antenna coil. Calibration should only need to be performed once for each unique model of storage system. The calibration values for each antenna coil can be stored and reused for each model.

A number of logical power level steps are first determined. A tag reader might have, for example, a large number of discrete power levels, such as 256 or more. Whilst it is possible to use such a large number of power levels to provide a high resolution, it is generally impractical to do so, at least due to the time it would take to perform the calibration and subsequent measurements. Therefore in some non-limiting embodiments between 2 and 32 power levels are used, for example between 2 and 16 power levels. For most applications it has been found that using between 2 and 8 power levels, depending upon the size and nature of the antenna and/or storage system, provides a sufficiently useful resolution of tag distance from each antenna.

To perform calibration, calibration tags are placed into the storage system. In some non-limiting embodiments the calibration tags may be separate and placed manually. In other non-limiting embodiments the calibration tags are mounted to at least one movable calibration member that allows the tags to (a) be mounted predetermined distances apart from each other and (b) be moved collectively. The movable calibration member should be made of a non-metallic material, such as cardboard or plastic, such that it does not interfere with the antenna fields. In some non-limiting embodiments it may comprise a flat surface, such as a sheet of cardboard or plastic, with the calibration tags arranged linearly or in a two dimensional array. In some circumstances it may be advantageous for the calibration member to comprise a shape that extends meaningfully in each dimension such that the calibration tags can be arranged three dimensionally.

Once the calibration tags have been placed as desired in the storage system, each antenna coil scans for the calibration tags at a plurality of different power levels. The relationship between power level and sighted calibration tags can be used to determine the effective range of each antenna coil at each power level.

An example calibration process may therefore be as follows:

1) Place calibration tags on a level of the storage system, e.g. starting with the lowest shelf of a cabinet.

2) For each antenna coil, starting from the lowest power level increase power stepwise until one or more tags is sighted and recording the power level at which each calibration tag sighting occurred.

3) Move the calibration tags to the highest height possible on that level, e.g. just under the shelf above in a shelved storage cabinet.

4) Repeat the power level scan in step 2 and record that as a second power level.

5) Move the calibration tags onto another level of the storage system, e.g. the shelf above and/or below the previous one.

6) Repeat the power level scan in step 2 and record that as a third power level.

7) Repeat the above steps for every level in the storage system.

With this example in mind, it should be appreciated that the calibration member may be constructed of a suitable geometry with sufficient calibration tags at appropriate locations that obviates the need for steps 3 and 4.

At the end of such a measurement phase, there will be three measurements of the lowest power level needed to sight calibration tags at the nearest, middle, and furthest distances. The raw measurements are converted into a set of logical power level settings to use for a given number of power levels. The logical power levels can be different to actual power levels for each antenna and therefore can be mapped to account for differing sensitivities of each antenna. The logical power levels can therefore correspond to distance using a known antenna input power. In some non-limiting embodiments the final power level step is at maximum power, so all remaining calibration tags at any distance within maximum range will be sighted. In some non-limiting embodiments the furthest distances are within the same shelf that the antenna is associated with. In other non-limiting embodiments the furthest distances are within a shelf above and/or below the shelf that the antenna is associated with.

Each antenna coil may have different physical power levels for each logical power level. The calibration process therefore helps to ensure that sightings of the same tag on different antenna coils can be compared with the power level input for each antenna coil approximating antenna coil range.

For example, on antenna coil A it may take a power setting of 100 to sight tags at a distance of 10 cm. But on antenna coil B it may only require a power setting of 60 to see the same distance. The calibration values can be used to compensate for this difference, so each logical power level corresponds to roughly the same distance from the antenna coil.

In some non-limiting embodiments, the calibration process includes calibrating the RFID reader power levels for the shelf that an antenna coil is associated with, i.e. to associate power levels with respective predefined distances from the antenna coil within the same shelf. In some non-limiting embodiments, the calibration process further includes calibrating the RFID reader power levels for the shelf that the antenna coil is associated with as well as for the shelf below and/or the shelf above the shelf that the antenna coil is associated with.

Item/Tag Scan

In standard (prior art) operation where presence of tags is all that needs to be determined, each tag is only sighted once on the first antenna it is seen on and then muted for the rest of the scan of other antennas. A tag sighting message, i.e. the information generated by an RFID reader when it initially gets a response from a previously unknown tag as part of the scanning process, is only generated for the first reply received even though readers are continuously scanning and as part of this process will re-sight known tags multiple times. In this type of non-specific location scanning, tag sighting messages are generated immediately whenever the initial sighting occurs, and the non-specific location information typically only comprises a single antenna number.

In contrast, for the non-limiting embodiments described herein where specific location scanning occurs, each tag may be sighted on more than one antenna, and a tag sighting message may or may not be generated for any of these actual sightings. In some non-limiting embodiments a tag sighting message is generated by the reader 104 after completing the scan of all antennas at the end of the analysis phase where it will refer to a specific location, such as "shelf 4 left side". The specific location tag sighting message may be the only tag sighting message generated and provided by the reader 104, or may be in addition to the non-specific tag sighting messages associated with actual antenna reads.

In some non-limiting embodiments an item/tag scan searches for tags using each antenna coil at multiple different power levels. The lowest power level for each antenna to sight a tag is recorded. The tag reader performs a complete scan of each antenna coil such that every tag will be re-seen multiple times on as many antenna coils as it can be powered from.

For each sighting, the antenna coil name and the lowest power level needed to sight the tag are recorded. By the end of the scan, each tag will have a list of sightings on different antennas and at different power levels. This tag sight data is stored for subsequent analysis in determining the location of a tag and, hence, the location of its associated item.

The scan can be carried out in a number of ways. A deep stack power level scan and a shallow stack power level scan have been identified as two useful variants which will now be described.

In some application tags are deeply stacked which means that multiple tags are stacked closely together. A common example of deeply stacked tags is in document tracking where each document has a tag. In this situation, a slower but reliable method is used which can sight tags in the middle of a deep stack. To use this method, tags are first set to a lower power mode, such as a quarter power mode such that only a quarter of the tag population is active at one time.

An example process to scan for tags that is well suited to deeply stacked tags is as follows:

1) Set an antenna coil to a lowest power level.
2) Scan for all tags visible at this power level.
3) Set the next highest power level.
4) Repeat the scan for all tags at this power level.
5) Repeat steps 3 and 4 until the highest power level has been reached (such that all power levels have been scanned).

In other applications tags may be shallowly stacked, meaning that no more than two tags should be stacked closely together. For example, a product in a box which has a tag attached. Even in a crate full of tagged products the tags are spaced apart because the size of the product box keeps them spaced apart. It is possible for two tags on two boxes to end up adjacent to one another (e.g. if their respective tags are facing each other), but no more deeply than this.

In this situation, a faster method can be implemented. To use this method, all tags are set to a normal power mode, which means they are powered all the time. This makes the scan process four times faster than using a quarter power mode as described for the deeply stacked situation.

This technique utilises tag memory on the tag itself. In this non-limiting embodiment the tag has Temporary RAM (TRAM) used to store tag settings or information. For example, PJM chips have tag memory that can be utilised as a time stamp and/or to mute or unmute a tag.

In the case of a 'C-Series PJM Chip', which is considered a suitable chip for use in the RFID tags, the time stamp memory is a 16-bit TRAM field. When a tag receives its first command after powering on, it stores a tag reader Time Stamp field in the chip's memory. When any future commands are received, this stored value is returned in a Time Stamp field of the tag's reply.

Utilising the memory of such a tag, an example process to scan for tags that is well suited to shallow stacked tags with memory in the form of a time stamp field is as follows:

1) Set the lowest power level and set the command Time Stamp field to a power level ID (which might initially equal 1 for example).
2) Transmit a single command containing this Time Stamp field.
3) Set the next highest power level, increment the power level ID, and set the Time Stamp field to the new power level ID.
4) Transmit a single command containing this Time Stamp field.
5) Repeat steps 3 and 4 for each power level except the final power level.
6) For the final power level, perform a full tag identification scan that reads the set power level ID from the Time Stamp field of each tag.

When the final scan is performed and all tags are sighted, each tag's reply will contain a Time Stamp. As the time stamp field of each tag was set with a power level ID the first time that tag came within range, the returned Time Stamps define the lowest power level at which each tag was sighted.

Location Analysis

Once a tag reader has completed a scan of all antenna coils, each tag seen will have a set of sightings from one or more antenna coils at different power levels. This tag sighting data can be used to determine the location of each tag in the storage system.

Figure 6:
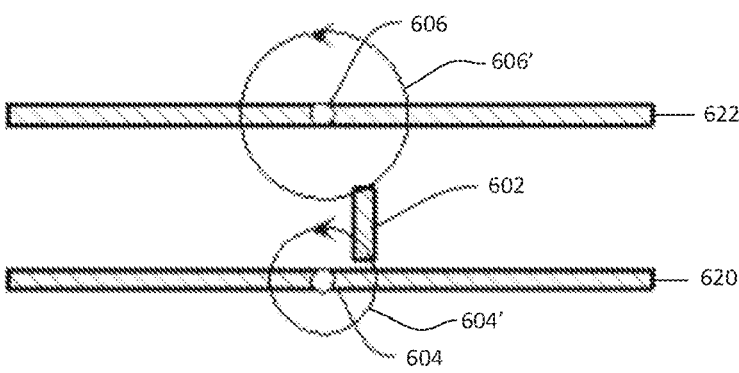
FIG. 6 is a schematic representation of a multi-level antenna arrangement sighting a tag.

For example, FIG. 6 illustrates a tag 602 affixed to an item on shelf 620. Above shelf 620 is a higher shelf 622. As illustrated, the tag 602 may be identified by the lower shelf antenna 604 as well as by the higher shelf antenna 606. In the illustrated example, the tag 602 is identified at a lower field strength (604') by the lower level antenna 604 than the higher field strength (606') required for the high level antenna 606 because the tag 602 is closer to the lower level antenna 604.

Each unique tag reader installation has a definition of the layout of antenna coils, so there is a known relationship between the physical structure of the storage system and its antenna coils. This relationship can be used to understand the meaning of multiple sightings of a tag. The antenna coil layout defines a hierarchy consisting of:

1) Shelf—all antenna coils are located on the same horizontal plane; and
2) Horizontal Position—groups of antennas that only power tags in a section of a level (e.g. shelf) of the storage system (only certain antenna designs offer this capability).

For each shelf level, a power level offset can be defined to bias results towards the lower shelf. The power level offset may be an offset applied to a logical power level for the antenna. This is because a tag seen at similar logical power levels on two different height shelf levels is more likely to be on the lower shelf when the antenna coils are positioned on, in, against or close to the floor of a shelf because the magnetic field will couple with tags above the antenna coil (i.e. in the shelf) and below the antenna coil (i.e. in the shelf below).

On the bottom shelf, for example, antennas may have a power level offset of zero, because it is a good reference point. The next shelf up could have an offset (e.g. 2), the shelf above a greater offset (e.g. 4), and so on (e.g. offset increases in steps of 2 for each shelf). For each tag sighting, the power level offset can be added to a logical power level. So if, for example, a tag was sighted at a logical power level of 1 on the bottom shelf, it would still be 1, whereas on the next shelf up it would become 3, and so on. Using this example, if a tag was in the middle between two shelves and seen at the same logical power level (without offset) by antennas on both shelves, then the location would be identified as the lower shelf (i.e. the lower power) because with the offset the antenna associate with the lower shelf is now sighting the tag two steps lower than the sighting from the antenna associated with the shelf above. It should be appreciated that the offset numbers provided are for example only. In reality, the offset numbers are likely to be different, and have more variance, as different offsets are used depending on various factors such as the number of logical power levels, the spacing between shelves, and antenna sensitivities etc.

Referring to the non-limiting embodiment in FIG. 2B for example, where there are four shelves each with an antenna coil (or an antenna coil arrangement comprising more than one coil) associated with a respective shelf floor, coil 1 will detect tags located in shelf 1 202D (and no tags below, as this is the bottom shelf). Coil 2 will detect tags located in shelf 2 202C, as well as tags located in shelf 1 202D below as the distance from coil 2 upwards and within shelf 2 is comparable to the distance from coil 2 downwards and within shelf 1. Coil 3 202B will detect tags located in shelf 3 and tags located in shelf 2 202C. In this exemplary non-limiting embodiment, if both coil 4 and coil 3 detect that same tag, the processor 110 of the reader 104 is configured to determine that the tag is located on shelf 3 202B (i.e., biased to the lower shelf). This is because the reading zones 212 formed by the magnetic fields of coil 3 and coil 4 overlap within shelf 3. The overlap reading zone 214 illustrated in FIG. 2B lies below shelf 4 202A and above and within shelf 3 202B.

It will be understood that in alternative non-limiting embodiments where the antenna coil arrangement is different, the height level bias may be applied differently. For example, if an antenna coil is positioned in the roof of a shelf, and/or where an overlap reading zone is generated in a top one of two shelves, then the processor of the RFID reader may be configured to determine that the location of a tag identified by two antenna coils may be the upper of two adjacent shelves. Similarly, it will be understood that other principles described herein may be applicable to other configurations of containers, for example a single-shelf container having horizontally adjacent sections (e.g. two or more drawers next to one another) wherein antenna configurations associated with the various sections are operated so that tags in more than one section may be detected by the antenna arrangement(s) associated with one section (or tags in more than two sections may be detected by the antenna arrangement(s) associated with one or more sections).

If horizontal position is not being used, then each shelf height level definition will define a set of antenna coils that are at that shelf height level. If horizontal position is used, then each position at each shelf height level will define a set of antenna coils for that location.

For each tag, all sighting antennas are examined. Even if horizontal location is to be determined, the first step is to determine which shelf height level the tag is on.

In order to determine the vertical location of a tag, it is first assumed to be located at one of a plurality of discrete storage system height levels (e.g. shelves). The power level offset is applied to the sighting power level for each tag to compensate for the vertical relationship between the discrete storage system height levels. The height location of the tag is determined to be the discrete storage system height level with the lowest logical power level including compensation for the power level offset.

If horizontal location is to be determined as well, then a second examination is performed using only tag sightings at the determined discrete storage system height level. No power level offset applies in determining the horizontal location at that level as all antenna coils are on the same horizontal plane. The lowest logical power level from an antenna coil therefore determines the horizontal position along the shelf. If a tag sighting is of close or equal power levels in two positions, then the tag is determined as being at an intermediate location between the two antenna coil groups. For example, a shelf with 4 horizontal antenna groups would have an additional 3 positions for the midpoints between two groups.

Once a tag location determination has been made, the tag location as determined by the processor 110 of the reader 104 may be displayed via the reader user interface 116 and/or may be sent to an end user application via the reader communication interface 114. The specific location may be described by the name of the layout. For example, "shelf 6" or, if horizontal location is included, "shelf 2, position 4".

ADVANTAGES

The system described herein allows tagged item locations to be determined (with an appropriately selected resolution) and provided to a user to assist with speedy and accurate location and identification of the tagged item. Advantageously, the location determination works in storage systems with open shelves. The method is efficient and can be performed with negligible performance penalty to existing systems. The system can be scaled to locate any number of tagged items in the storage system.

Using a blood supply service freezer as an example, previously staff would have to search for a specific blood bag by hand in −40° C. temperature. This is not only uncomfortable to the staff, but is prone to human error and possibly inadvertently damaging handled bags. With the system described herein the staff would be able to first interrogate the location of the needed blood bag and know where it is located (i.e. the shelf and where on the shelf it is), saving a lot of time and discomfort, avoiding potential damage, and reducing the likelihood of human error.

Using a blood shelving management system as another example, tagged blood bags are stored in trays that are over 1 metre long. The trays are removable and are slide on a shelf of a multi-tier storage system. Previous RFID systems can, at best, only determine a coarse location of the tagged blood bag. For example, as being located either in a left, right, or a central zone of the shelf. The system described herein provides a high-resolution method that can accurately locate one or more blood bags of interest.

It is noted that the foregoing has outlined some of the more pertinent non-limiting embodiments. It will be clear to those skilled in the art that modifications to the disclosed non-embodiment can be effected without departing from the spirit and scope thereof. As such, the described non-limiting embodiment ought to be considered to be merely illustrative of some of the more prominent features and applications. Other beneficial results can be realized by applying the non-limiting embodiments in a different manner or modifying them in ways known to those familiar with the art. This includes the mixing and matching of features. Elements and/or functions between various non-limiting embodiment(s) is expressly contemplated herein so that one of ordinary skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. A method of determining the location of a plurality of tagged items in a storage system comprising a plurality of height levels, the method comprising:

scanning for tags with a first antenna at a plurality of power levels, the first antenna associated with a first height level of the storage system;

identifying each tag of interest sighted by the first antenna at each power level of the plurality of power levels and recording tag sight data;

scanning for tags with at least one further antenna at a plurality of power levels, the at least one further antenna associated with respective at least one further height levels;

identifying each tag of interest sighted by each further antenna at each power level of the plurality of power levels and recording further tag sight data;

analysing the tag sight data and the further tag sight data to determine a location of each tag of interest by applying a height level bias favouring lower shelves, wherein the determined location of each tag of interest comprises an item height level.

2. The method of determining the location of a plurality of tags in a storage system of claim 1, wherein the step of scanning for tags with a first antenna at a plurality of power levels comprises activating an antenna coil of the first antenna at each of the plurality of power levels and the step of identifying each tag sighted by the first antenna at each power level comprises receiving response signals from at least a portion of the plurality of tags at each power level.

3. The method of claim 1, wherein a field intensity emitted from each antenna varies a predetermined amount according to each power level.

4. The method of claim 1, wherein the power levels are logical power levels that correspond to actual power levels required for predetermined antenna ranges.

5. The method of claim 1, further comprising the step of calibrating the antenna power levels in the storage system.

6. The method of claim 5, wherein the step of calibrating the antenna power levels in the storage system comprises:

placing a plurality of calibration tags into the storage system;

scanning for the calibration tags with each antenna at a plurality of different power levels;

identifying the minimum power level each antenna sights each calibration tag; and setting one or more calibration values for each antenna from the identified minimum power levels.

7. The method of claim 6, wherein the steps of calibrating the antenna power levels in the storage system are repeated with the calibration tags being located at a plurality of different levels within the storage system.

8. The method of claim 5, wherein the step of calibration compensates for antenna coil differences such that each logical power level of each antenna corresponds to substantially the same antenna coil range.

9. The method of claim 1, wherein the tags are set to a lower power mode, that reduces the number of tags in the storage system that are active, prior to scanning for the tags.

10. The method of claim 1, wherein the tags comprise memory and the method further comprises the step of storing a value representative of the power level at which the tag is first sighted.

11. The method of claim 10, wherein the memory is a time stamp field and the value representative of the power level at which the tag is first sighted being stored in the time stamp field is a power level ID.

12. The method of claim 1, wherein analysing the tag sight data and the further tag sight data to determine a location of each tag of interest comprises applying a power level offset that biases antenna power levels towards a lower height level for each height level of the storage system, wherein the power level offset increases for higher height levels.

13. The method of claim 12, wherein the power level offset is applied to a logical power level for the antenna.

14. The method of claim 11, wherein the step of estimating a position of each tag of interest using the determined antenna and the lowest power level that identified that tag comprises identifying a horizontal position of the tag of interest at the height level of the storage system at which the tag is identified as being located.

15. The method of claim 14, wherein the horizontal position of the tag of interest is determined to be at a distance from the antenna with the lowest power level that identified that tag that corresponds to a range of that antenna at that power level.

16. The method of claim 1, wherein the first antenna and at least one further antennas are located on or in the storage system.

17. The method of claim 16, wherein the storage system comprises height levels and at least some of the height levels comprise at least two overlapping antennas with overlapping coils.

18. The method of claim 17, wherein each of the at least two antennas with overlapping coils comprises a first loop having a first current flow and a second loop having a second current flow in a rotationally opposite direction to the first current flow.

19. The method of claim 18, wherein the overlapping antenna coils of the overlapping antennas are arranged to overlap so that the loops are aligned along an axis, thereby generating a continuous reading zone along that axis.

20. The method of claim 19, wherein the continuous reading zone corresponds to a section of the storage system.

21. A system for determining the location of an RFID tagged item located in a storage system comprising a plurality of height levels and configured to contain a plurality of RFID tagged items, the system comprising:

a plurality of antenna coils configured to be associated with one or more respective height levels of the storage system;

an antenna controller configured to energise the antenna coils at a power level that corresponds to a received power level signal; and a processor in communication with the antenna controller, the processor configured to:

output a plurality of power level signals to the antenna controller to selectively activate each RFID antenna coil at a plurality of different power levels;

receive response signals from each antenna coil at each power level;

identify each RFID tag sighted in each received response signal and recording tag sight data;

analyse the tag sight data to determine a location of each RFID tag sighted by applying a height level bias favouring lower shelves, wherein the determined location of each RFID tag sighted comprises an item height level.

* * * * *